United States Patent [19]
Kato et al.

[11] Patent Number: 6,104,577
[45] Date of Patent: Aug. 15, 2000

[54] DISC CASSETTE HAVING A RECESS WITH AN INCLINED BACK WALL

[75] Inventors: Shinichiro Kato; Shuichi Kikuchi, both of Miyagi, Japan

[73] Assignee: Sony Corporation, Tokyo, Japan

[21] Appl. No.: 08/397,648

[22] Filed: Mar. 2, 1995

[30] Foreign Application Priority Data

Mar. 10, 1994 [JP] Japan .................................. 06-039398

[51] Int. Cl.⁷ .................................................. G11B 23/03
[52] U.S. Cl. ............................................................ 360/133
[58] Field of Search ................................ 360/133, 99.06; 369/291

[56] References Cited

U.S. PATENT DOCUMENTS 5,036,421  7/1991  Kaneda et al. ........................... 360/133
5,084,862  1/1992  Fujita et al. ............................. 360/133
5,226,035  7/1993  Kato et al. ............................... 360/133

*Primary Examiner*—Jefferson Evans
*Attorney, Agent, or Firm*—Jay H. Maioli

[57] ABSTRACT

A disc cassette has a case in which a disc-like recording medium is rotatably received. The case has an opening through which at least a part of the recording medium is exposed. A rectangular recess is formed on a front area of the case where the opening is positioned. The recess is defined by two opposed side walls, a back wall and a bottom wall. The back wall faces forward. A shutter is slidably engaged with the recess in a manner to selectively open and close the opening. The shutter is slidable in a direction parallel with the direction in which the back wall extends. The back wall of the rectangular recess has a surface which is inclined relative to the bottom wall.

6 Claims, 9 Drawing Sheets

DISC CASSETTE HAVING A RECESS WITH AN INCLINED BACK WALL

BACKGROUND OF THE INVENTION

1. Field of the Invention

The present invention relates in general to disc cassettes for use in a disc player, and more particularly to the disc cassettes of a type having a sliding shutter by which a part of a disc rotatably disposed in a case (or shell) is selectively exposed and concealed.

2. Description of the Prior Art

In order to clarify the task of the present invention, one conventional disc cassette 101 of the above-mentioned type will be described with reference to FIGS. 11 and 12 of the drawings.

FIG. 11 shows a perspective view of the disc cassette 101, and FIG. 12 shows an enlarged sectional view of a shutter structure of the disc cassette 101, which is taken from the direction of the arrow XII of FIG. 11.

The disc cassette 101 is of a type usually called "3.5 inch microfloppy disc". As is seen from FIG. 11, the disc cassette 101 comprises a disc 102 as a recording medium, a rectangular case (or shell) 105 having the disc 102 rotatably disposed therein, and a shutter structure provided on the case 105 to selectively expose and conceal a part of the disc 102 in the case 105.

As is seen from FIGS. 11 and 12, the shutter structure comprises a rectangular recess 103 formed in each of upper and lower surfaces of the case 105 (see FIG. 12), a smaller rectangular opening 104 formed in the case 105 within the area of each recess 103 to expose a part of the disc 102 to the outside, and a rectangular shutter 106 slidably engaged with the recess 103 to selectively open and close the opening 104.

As is seen from FIGS. 11 and 12, each rectangular recess 103 of the case 105 is defined by two side walls 103a and 103a", a back wall 103a' and a bottom wall 103b.

As is seen from FIG. 11, the shutter 106 is formed with a rectangular opening 109 which is somewhat larger than the opening 104 of the case 105. The shutter 106 is biased toward a closed position by a coiled spring 108 which has one end hooked to the shutter 106 at 107 and the other end hooked to the case 105. That is, in the closed position of the shutter 106, a major solid part of the shutter 106 covers the opening 104, as is shown in the drawing.

When the shutter 106 is slid from the closed position in the direction of the arrow "O" against the biasing force of the coiled spring 108 and takes its open position, the opening 109 of the shutter 106 becomes registered with the opening 104 of the case 105 thereby to expose a part of the disc 102 to the outside.

As is seen from FIG. 12, the back wall 103a' of the recess 103 is formed perpendicular to the bottom wall 103b and the depth "D" of the recess 103 is greater than the thickness "T" of a plate of the shutter 106.

However, due to its inherent construction, the above-mentioned conventional disc cassette 101 has the following drawbacks.

As is seen from FIG. 13, when a plurality of the disc cassettes 101 are put into a cassette holder 202 of a disc player 201 for playing the discs 102 in succession, the disc cassettes 101 are piled up in the cassette holder 202. In fact, such successional playing is widely used when it is needed to record or dub the same information on many discs (viz., dubbing).

However, when the disc cassettes 101 of the above-mentioned conventional type are subjected to such successional playing, smooth loading of each cassette 101 into a drive device 204 (see FIG. 14) is not expected. That is, as is seen from FIG. 14, for the cassette loading, a pusher 203 pushes the lowermost disc cassette 101a of the stack of cassettes 101 toward the drive device 204. However, in this case, it tends to occur that the second cassette 101b from the bottom obstructs the loading movement of the lowermost disc cassette 101a for the following reason.

As is seen from FIG. 15, when the cassettes 101 are stacked in the cassette holder 202, the shutter 106 of the second cassette 101b would be partially put into the recess 103 of the lowermost disc cassette 101a. This is because the depth "D" of the recess 103 is greater than the thickness "T" of the plate of the shutter 106. When, under this condition, the lowermost disc cassette 101a is forced to move leftward in FIG. 15 by the pusher 203, the back wall 103a' of the recess 103 of the lowermost disc cassette 101a is brought into abutment with the leading end of the shutter 106 of the second cassette 101b, which blocks the loading movement of the lowermost disc cassette 101a into the drive device 204.

The total weight of the cassette stack 101 causes a non-negligible deformation of the lowermost disc cassette 101a, which promotes the undesired penetration of the shutter 106 of the second cassette 101b into the recess 103 of the lowermost disc cassette 101a. Furthermore, the perpendicular orientation of the back wall 103a' relative to the bottom wall 103b promotes the undesired blocking engagement of the shutter 106 of the second cassette 101b with the back wall 103a'.

Furthermore, as is seen from FIG. 12, such perpendicular orientation of the back wall 103a' relative to the bottom wall 103b causes collection of dust 111 at the corner of the recess 103 defined therebetween.

SUMMARY OF THE INVENTION

It is therefore an object of the present invention to provide a disc cassette which is free of the above-mentioned drawbacks.

According to the present invention, there is provided a disc cassette which comprises a case in which a disc-like recording medium is rotatably received, the case having an opening through which at least a part of an information recording area of the medium is exposed; means defining a rectangular recess on a front area of the case where the opening is positioned, the recess being defined by two opposed side walls, a back wall and a bottom wall, the back wall being oriented to face forward; and a shutter slidably engaged with the recess in a manner to selectively open and close the opening, the shutter being slidable in a direction parallel with the direction in which the back wall extends, wherein the back wall of the rectangular recess has a surface which is inclined relative to the bottom wall.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
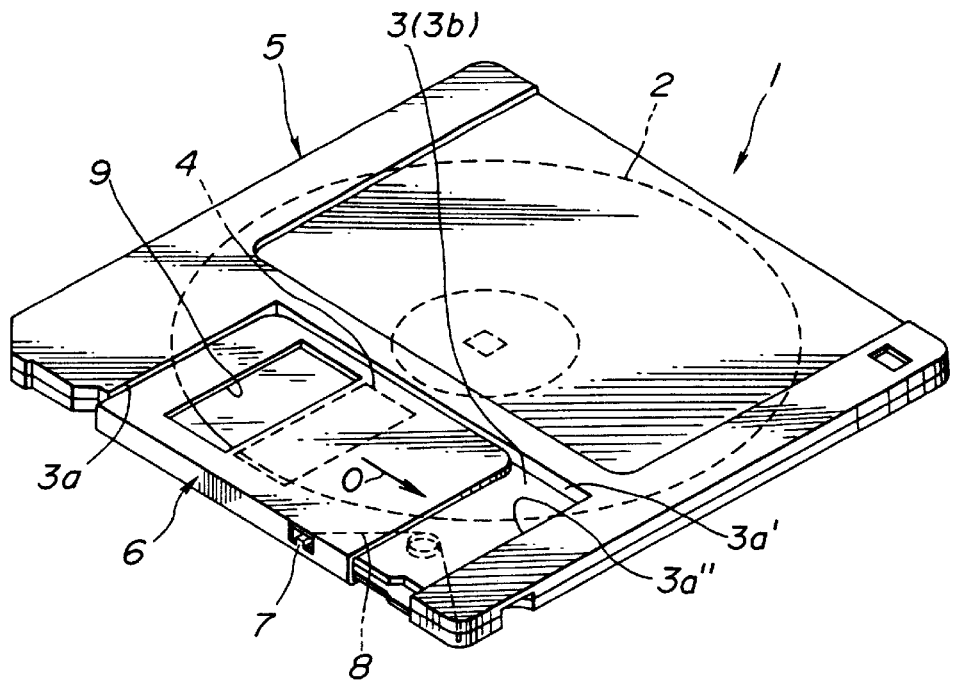
FIG. 1 is an upper perspective view of a disc cassette which is a first embodiment of the present invention.
Figure 2:
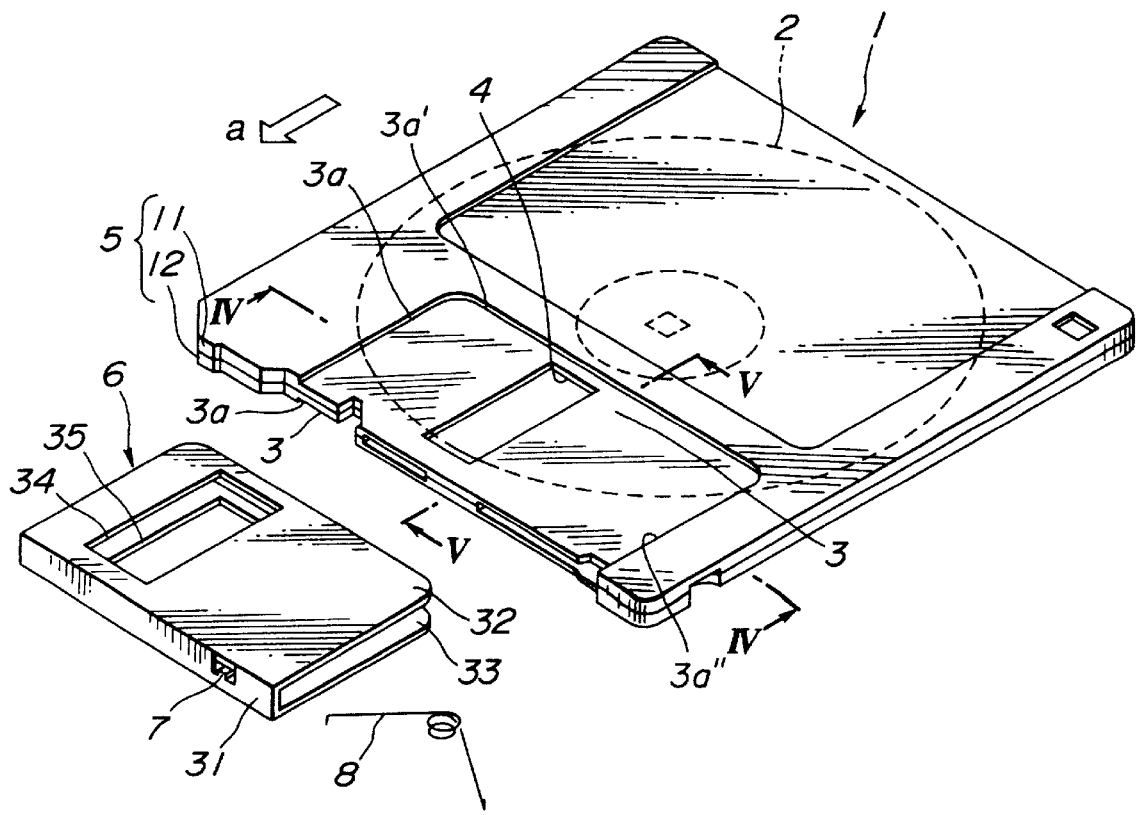
FIG. 2 is an upper perspective view of the disc cassette of the first embodiment with a shutter dismantled therefrom.
Figure 3:
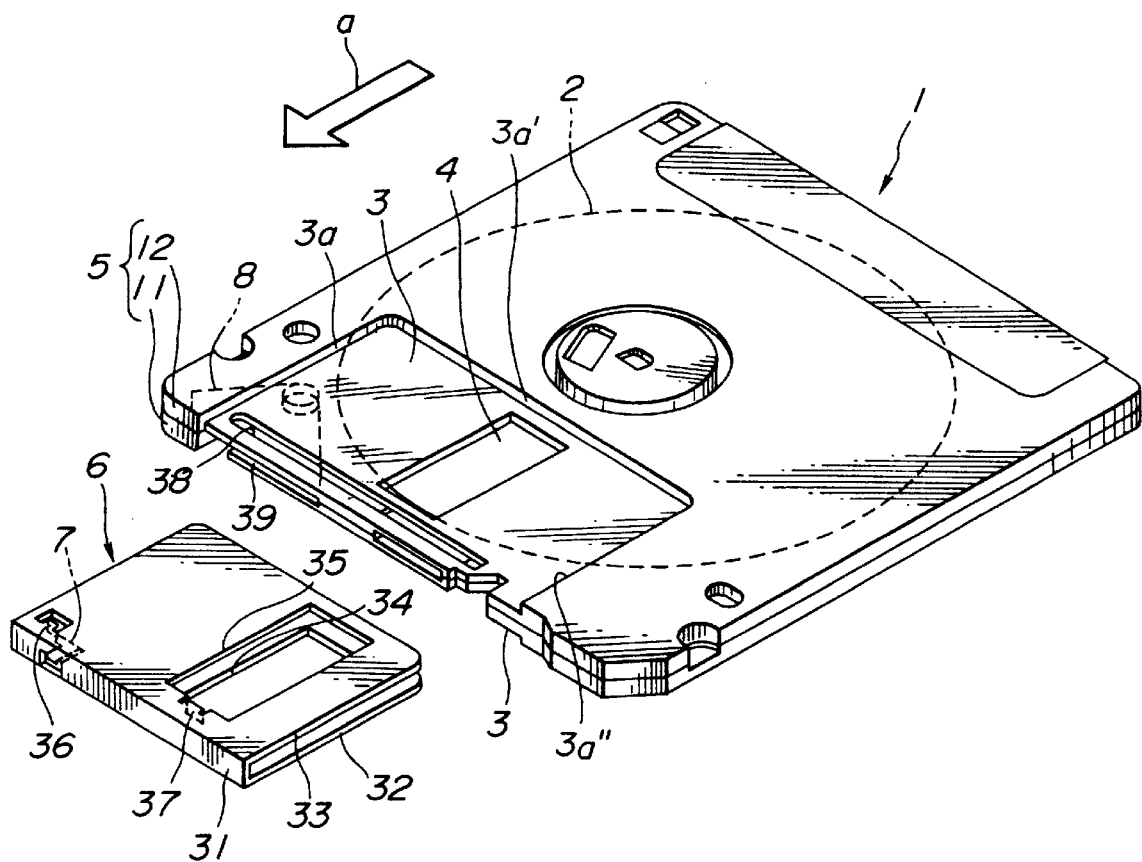
FIG. 3 is a back perspective view of the disc cassette of the first embodiment with the shutter dismantled therefrom.

Referring to FIGS. 1 to 8 of the drawings, particularly FIGS. 1 to 3, there is shown a disc cassette 1 which is a first embodiment of the present invention.

As is seen from FIG. 1, the disc cassette 1 is of the 3.5 inch microfloppy disc type, which comprises a disc 2 as a recording medium, a rectangular case (or shell) 5 having the disc 2 rotatably disposed therein, and a shutter structure provided on the case 5 to selectively expose and conceal a part of the disc 2 in the case 5.

The shutter structure comprises a rectangular recess 3 formed in each of upper and lower surfaces of the case 5 (see FIG. 5), a smaller rectangular opening 4 formed in the case 5 within the area of the recess 3 to expose a part of the disc 2 to the outside, and a rectangular shutter 6 slidably engaged with the recess 3 to selectively open and close the opening 4.

Referring back to FIG. 1, the shutter 6 is formed with a rectangular opening 9 which is somewhat larger than the opening 4 of the case 5. The shutter 6 is biased to take its closed position by a coiled spring 8 which has one end hooked to the shutter 6 at the portion 7 and the other end hooked to the case 5. That is, in the closed position of the shutter 6, a major solid part of the shutter 6 covers the opening 4, as is shown in FIG. 1.

When the shutter 6 is slid from the closed position in the direction of the arrow "O" of FIG. 1 against the biasing force of the torsion spring 8 and takes its open position, the opening 9 of the shutter 6 becomes registered with the opening 4 of the case 5 thereby to expose a part of the disc 2 to the outside.

As will be well understood from FIGS. 2 and 3, the rectangular case 5 comprises an upper half-part 11 and a lower half-part 12 which are coupled to have a thin space defined therebetween. That is, the rectangular recess 3 is formed at a front part of each of the upper and lower half-parts 11 and 12.

Figure 14:
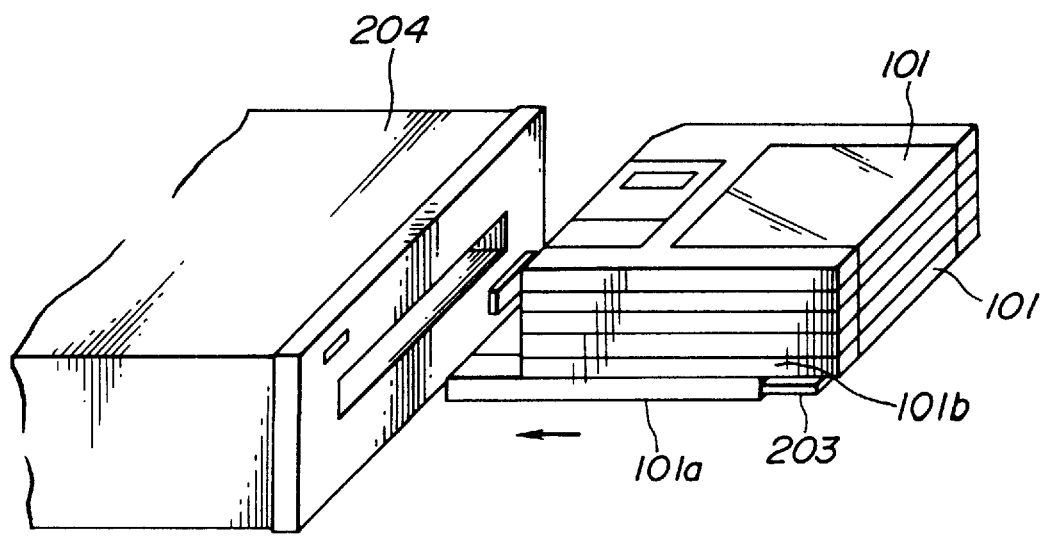
FIG. 14 is a perspective view of a stack of the conventional disc cassettes in a condition wherein the lowermost disc cassette is pushed toward the disc drive device of the disc player.
Figure 15:
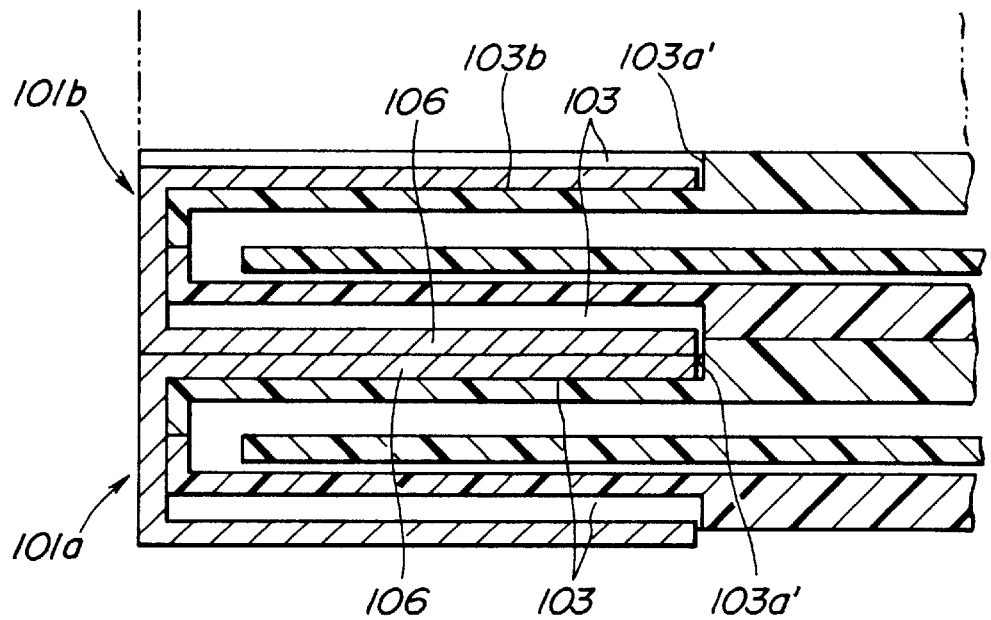
FIG. 15 is a view similar to FIG. 6, but showing a case of the conventional disc cassette.
Figure 16:
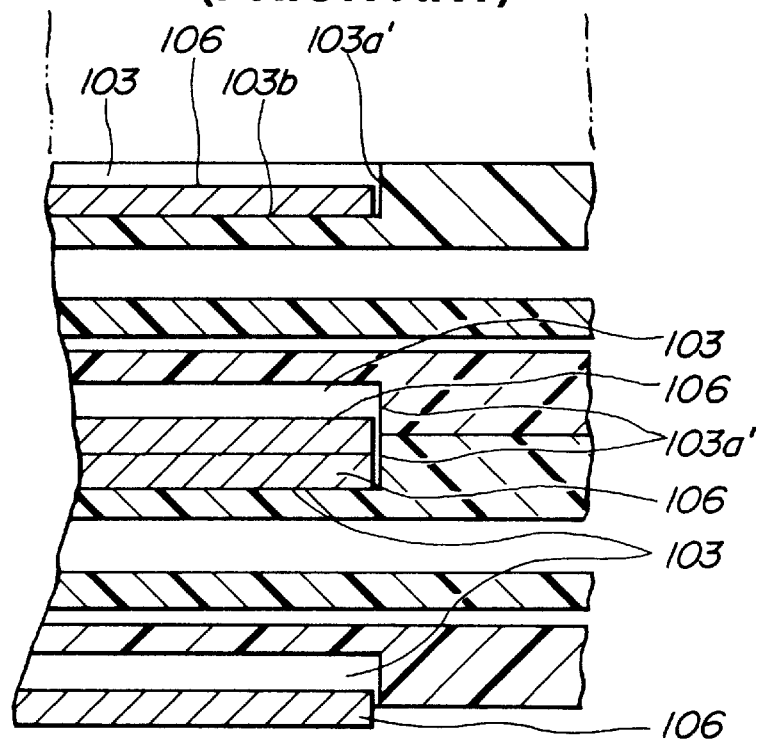
FIG. 16 is an enlarged view of a part of FIG. 15.

It is to be noted that the terms "front", "rear", "forward", "rearward" and the like used in this specification are taken with respect to the direction of the arrow "a" of FIG. 2 in which direction the disc cassette 1 is pushed when loading of the same into the disc drive device 204 (see FIG. 14) is required.

Figure 11:
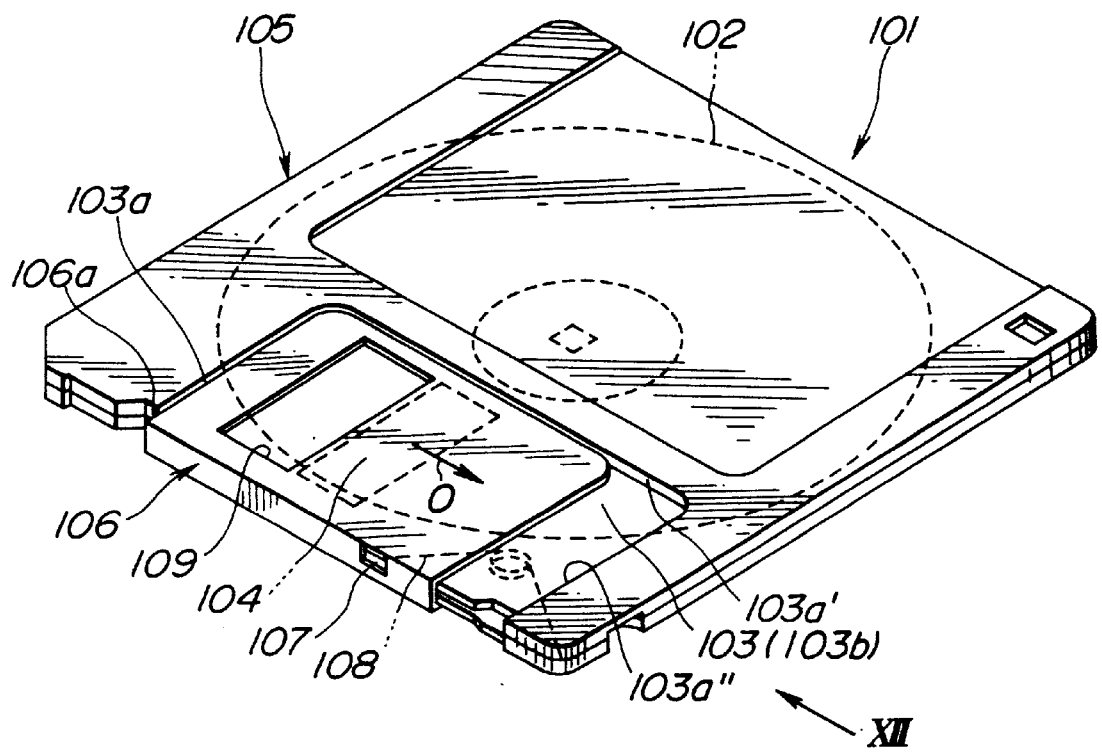
FIG. 11 is an upper perspective view of a conventional disc cassette.
Figure 12:
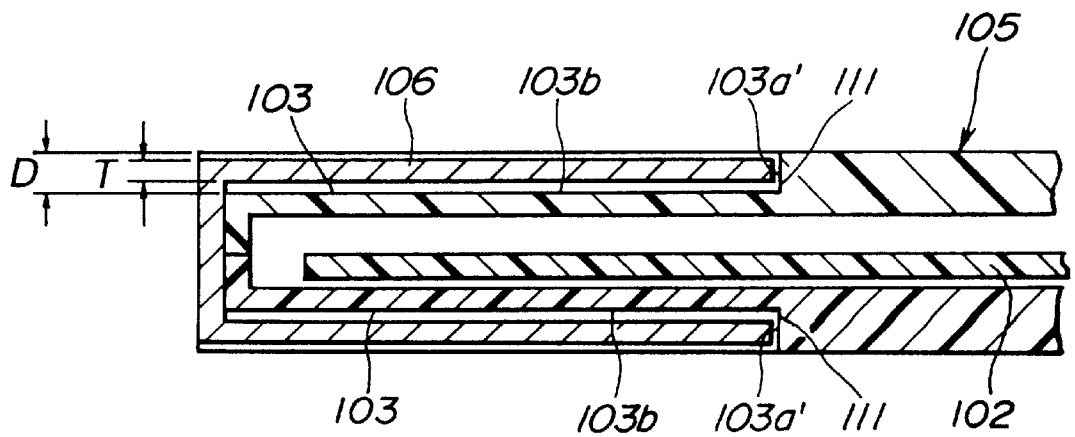
FIG. 12 is an enlarged sectional view taken along the line XII—XII of FIG. 11.

As is seen from FIGS. 1, 2, 4 and 5, similar to the above-mentioned conventional disc cassette 101 (see FIG. 11), each rectangular recess 3 is defined by two side walls 3a and 3a", a back wall 3a' and a bottom wall 3b. The opposed side walls 3a and 3a" extend in parallel with the direction of the arrow "a", and the back wall 3a' extends perpendicular to the direction of the arrow "a". That is, the back wall 3a' faces forward.

Figure 4:
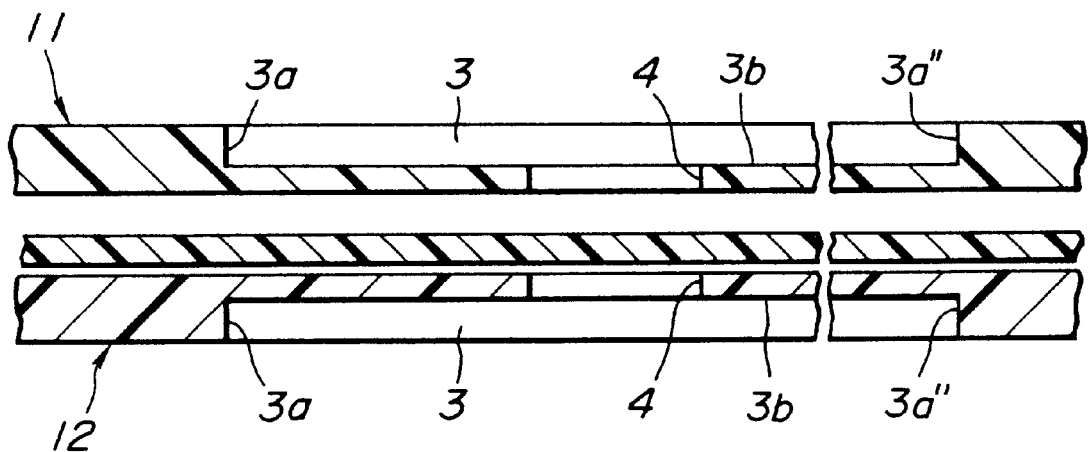
FIG. 4 is an enlarged sectional view taken along the line IV—IV of FIG. 2.

As is seen from FIG. 4, the opposed side walls 3a and 3a" are formed perpendicular to the bottom wall 3b of the recess 3.

Figure 5:
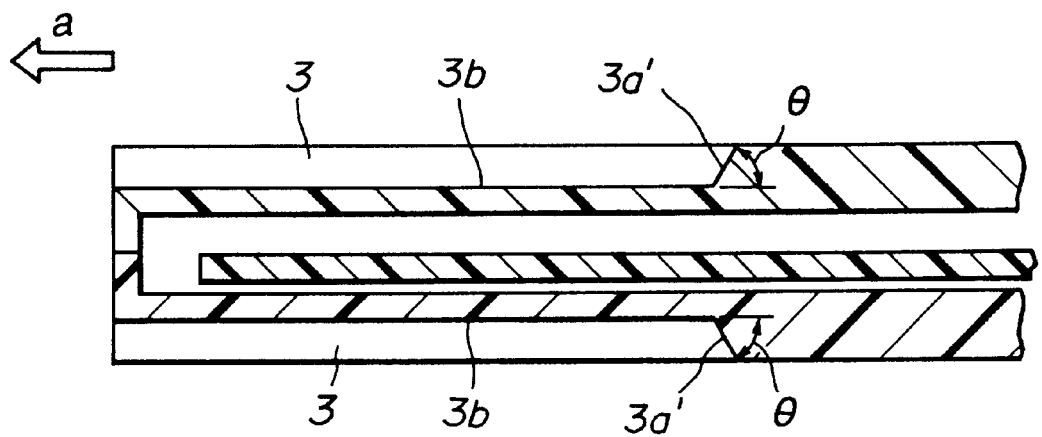
FIG. 5 is an enlarged sectional view taken along the line V—V of FIG. 2.

In addition, as is seen from FIG. 5, the back wall 3a' of the recess 3 is inclined by an angle "θ" relative to the bottom wall 3b. Preferably, the angle "θ" is about 60 degrees.

As is seen from FIG. 2, the shutter 6 comprises upper and lower shutter plates 32 and 33 which are integrally connected through a bridge plate 31. The bridge plate 31 has a raised portion 7 to which one end of the coiled spring 8 is hooked. The upper and lower shutter plates 32 and 33 have respective rectangular openings 34 and 35 which constitute the opening 9.

As is seen from FIG. 3 which shows the back view of the disc cassette 1, the bottom wall 3 of the recess 3 of the lower half-part 12 of the case 5 is formed with a guide groove 38 which extends perpendicular to the direction of the arrow "a". The lower shutter plate 33 of the shutter 6 is formed with two inwardly projected lugs 36 and 37 which are aligned. Upon mounting the shutter 6 on the case 5, the lugs 36 and 37 of the shutter 6 become slidably engaged with the guide groove 38 thereby to guide the slide movement of the shutter 6 relative to the front portion of the case 5.

Designated by numeral 39 in FIG. 3 is a slit formed in the case 5 for inserting the coiled spring 8 into a right position in the case 5.

In the following, advantages obtained by the disc cassette 1 of the first embodiment will be described with reference to FIGS. 6, 7 and 8.

Figure 6:
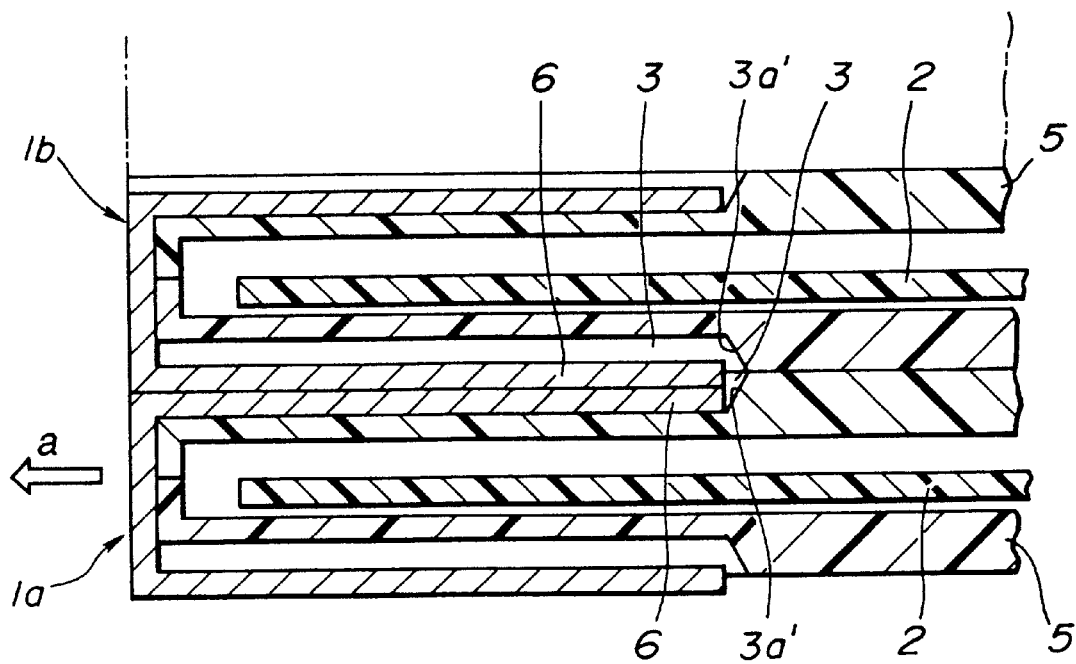
FIG. 6 is an enlarged sectional view of a stack of the disc cassettes of the first embodiment.
Figure 13:
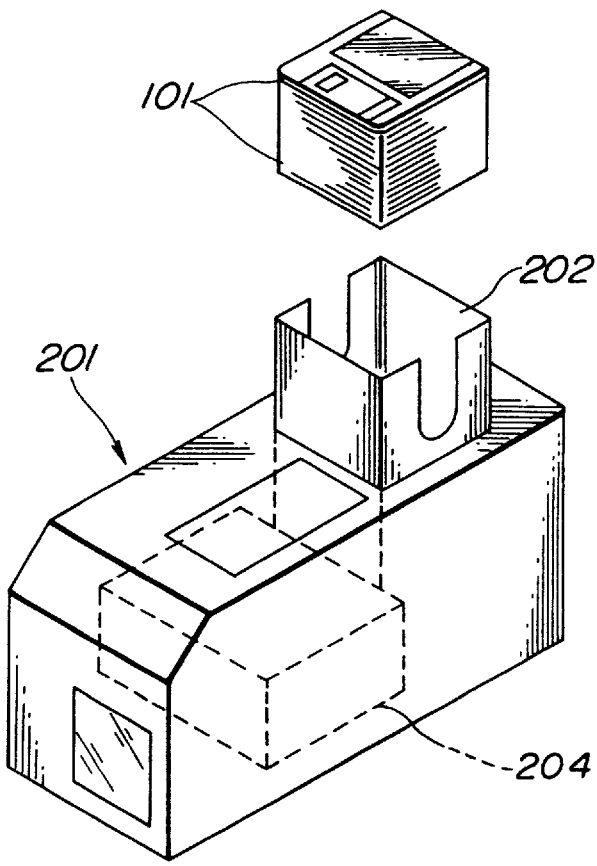
FIG. 13 is a schematic view of a disc player which plays a plurality of disc cassettes in succession.

When a plurality of the disc cassettes 1 are put into the cassette holder 202 of the disc player 201 (see FIGS. 13 and 14) for playing the discs 2 in succession, the disc cassettes 1 are piled up in the cassette holder 202 in a manner as is shown in FIG. 6. Thus, for the reasons which have been described in the part of the conventional disc cassette 101, the shutter 6 of the second disc cassette 1b from the bottom is partially put into the recess 3 of the lowermost disc cassette 1a.

However, in the present invention, smooth loading of the lowermost disc cassette 1a into the drive device 204 is achieved due to the following.

Figure 7:
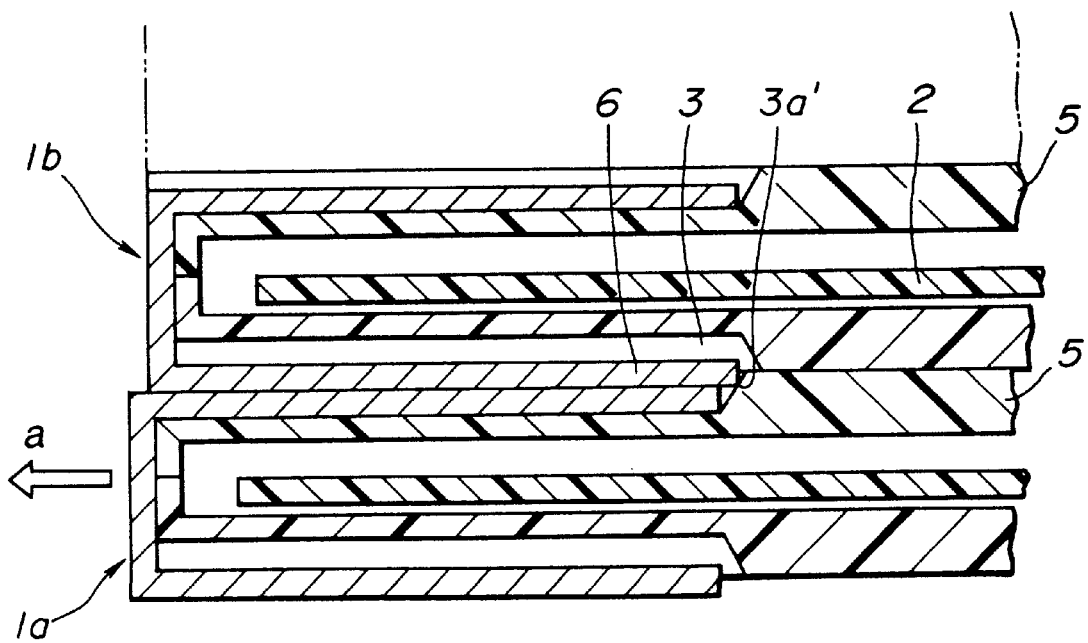
FIG. 7 is a view similar to FIG. 6, but showing a condition wherein the lowermost disc cassette is somewhat displaced toward a disc drive device.
Figure 8:
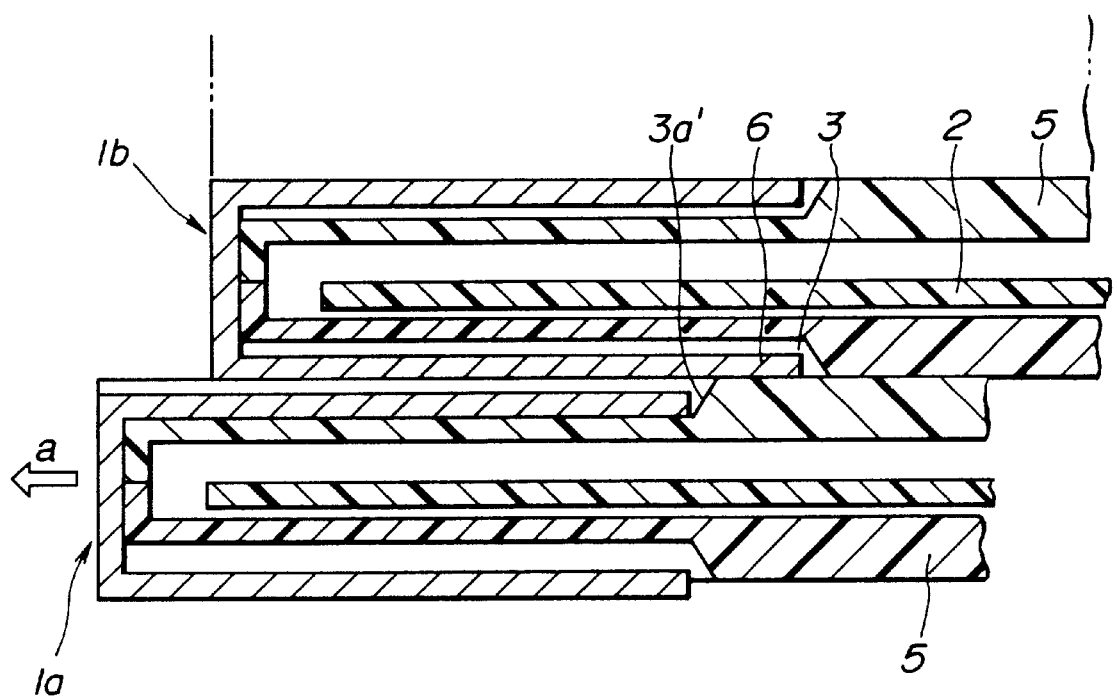
FIG. 8 is a view similar to FIG. 6, but showing a condition wherein the lowermost disc cassette is further displaced toward the disc drive device.

When, as will be understood from FIGS. 6 and 7, the lowermost disc cassette 1a is moved leftward toward the disc drive device 204 by the pusher 203, the inclined back wall 3a' of the recess 103 of the lowermost disc cassette 1a is brought into abutment with the leading end of the shutter 6 of the second cassette 1b. However, due to the inclined orientation possessed by the back wall 3a', the leftward movement of the lowermost disc cassette 1a is not blocked by the shutter 6. That is, as is seen from FIG. 8, when the lowermost disc cassette 1a is further pushed leftward, the leading end of the shutter 6 is slid up on the inclined back wall 3a' and finally put on a major flat surface of the lowermost disc cassette 1a. Thus, the lowermost disc cassette 1a can be smoothly slid into the disc drive device 204. For the same reason, the second disc cassette 1b and the other disc cassettes can be slid into the drive device 204 smoothly in succession.

Moreover due to the inclined orientation of the back wall 3a', the corner of the recess 3 is protected from collecting dust therein.

Figure 9:
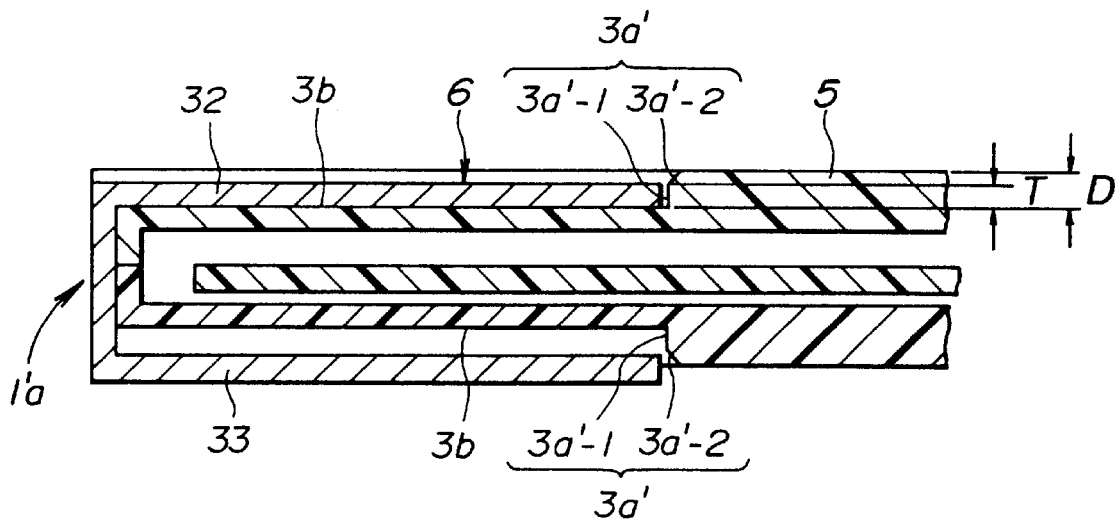
FIG. 9 is a view similar to FIG. 5, but showing a second embodiment of the present invention.

Referring to FIG. 9, there is shown a disc cassette 1' which is a second embodiment of the present invention.

In this second embodiment, only the upper part of the back wall 3a', is inclined. That is, the back wall 3a' comprises a first wall part 3a'-1 which is perpendicular to the bottom wall 3b of the recess 3 and a second wall part 3a'-2 which is inclined relative to the bottom wall 3b. More specifically, the first wall part 3a'-1 has a height from the bottom wall 3b, which is equal to the thickness "T" of the upper shutter plate 32 of the shutter 6, and the second wall part 3'a-2 has a height from the bottom wall 3b, which is greater than the thickness of the upper shutter plate 32 of the shutter 6 but smaller than the depth "D" of the recess 3, as is seen from FIG. 9.

Figure 10:
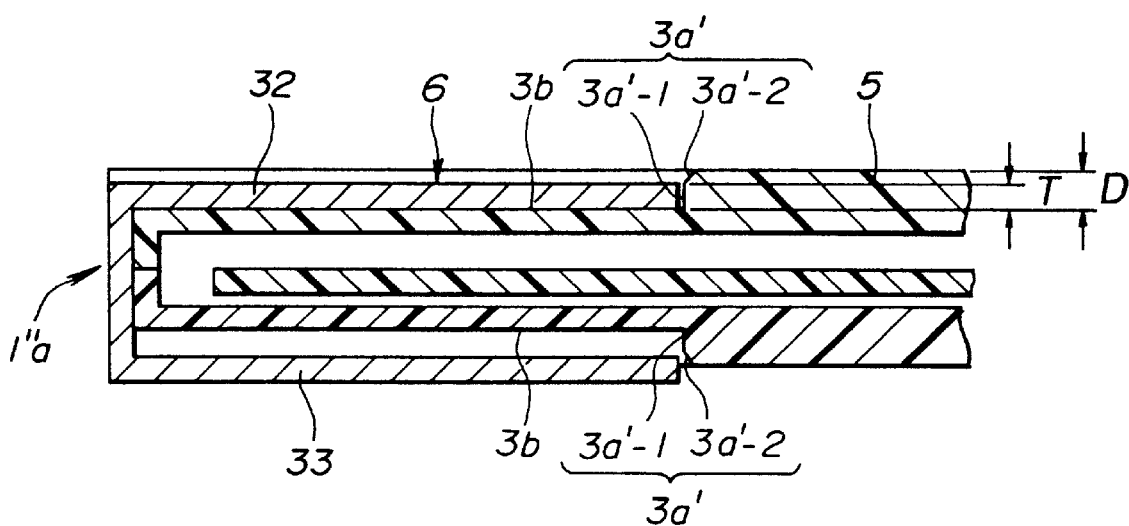
FIG. 10 is a view similar to FIG. 5, but showing a third embodiment of the present invention.

Referring to FIG. 10, there is shown a disc cassette 1" which is a third embodiment of the present invention.

The disc cassette 1" of this third embodiment is substantially the same as disc cassette 1' of the second embodiment except that in the third embodiment, the second wall part 3a'-2 is convexly curved, as shown.

In these second and third embodiments 1' and 1", the same advantages as those of the abovementioned first embodiment 1 are obtained.

That is, as will be understood from FIGS. 9 and 10, when, with the shutter of the second disc cassette (not shown) being partially put into the recess 3 of the lowermost disc cassette 1'a or 1"a, the lowermost disc cassette 1'a or 1"a is pushed leftward in the drawings, the inclined or curved second part 3a'-2 of the back wall 3a' permits the leading end of the shutter of the second disc cassette to slide up thereon and finally put on the major flat surface of the lowermost disc cassette 1'a or 1"a. In fact, it never occurs that the leading end of the shutter of the second disc cassette (not shown) abuts against the vertical first part 3a'-2 of the back wall 3a' of the recess 3.

If desired, the two side walls 3a and 3a" of the recess 3 may have the same configuration as the back wall 3a'. In this case, the recess 3 is protected from collecting dust at the corner thereof.

As is understood from the foregoing description, in accordance with the present invention, the following two advantages are obtained, which are not expected from the aforementioned conventional disc cassette 101.

First, even when a plurality of the disc cassettes 1, 1' or 1" are piled up in the cassette holder 202 of the disc player 201 for the continuous playing of the discs 2, the disc cassettes can be smoothly inserted into the drive device 204 one after another by the pusher 203.

Second, the recess 3 of the disc cassette 1, 1' or 1" is protected from collecting dust at the corner thereof.

What is claimed is:

1. A disc cassette comprising:

a case in which a disc-like recording medium having an information recording area is rotatably received, said case having an opening through which at least a part of said information recording area of said medium is exposed;

means for defining a rectangular recess on a front area of said case where said opening is positioned, said rectangular recess being defined by two opposed side walls, a back wall and a bottom wall, said back wall being oriented to face forward; and a shutter slidably engaged with said rectangular recess in a manner to selectively open and close said opening, said shutter being slidable in a direction parallel to a direction in which said back wall extends, wherein said back wall of said rectangular recess has a surface inclined relative to said bottom wall, said back wall and said bottom wall forming an obtuse angle, and wherein a height of said back wall defines a depth of said rectangular recess, said depth being greater than a thickness of said shutter.

2. A disc cassette as claimed in claim 1, wherein said surface of said back wall is inclined relative to said bottom wall such that said back wall and said bottom wall form an angle of 120 degrees.

3. A disc cassette as claimed in claim 1, in which said inclined surface of said back wall has a contoured convex curve.

4. A disc cassette as claimed in claim 1, in which said inclined surface of said back wall is a beveled surface having a slant of approximately 60 degrees from said bottom surface of said rectangular recess.

5. A disc cassette comprising:

a case in which a disc-like recording medium having an information recording area is rotatably received, said case having a rectangular recess formed on a front area thereof, said rectangular recess being defined by two opposed side walls, a back wall and a bottom wall, and an opening formed in said rectangular recess, at least a part of said information recording area of said disc-like recording medium being exposed through said opening; and a shutter slidably engaged with said rectangular recess in a manner to selectively open and close said opening, said shutter being slidable in a direction parallel to a direction in which said back wall extends, wherein said back wall is oriented to face forward and comprises a first portion and a second portion, said first portion being perpendicular to said bottom wall and said second portion being inclined relative to said bottom wall.

6. A disc cassette as claimed in claim 5, wherein a height of said back wall of said rectangular recess defines a depth of said rectangular recess, said depth being greater than a thickness of said shutter, and wherein a height of said first portion of said back wall is not greater than said thickness of said shutter.

* * * * *